(12) United States Patent
Xu et al.

(10) Patent No.: US 12,346,360 B2
(45) Date of Patent: Jul. 1, 2025

(54) UNSUPERVISED MACHINE LEARNING MODEL FRAMEWORK FOR KEYWORD ANALYSIS IN REAL-TIME OF MULTILINGUAL DOCUMENTS

(71) Applicant: PAYPAL, INC., San Jose, CA (US)

(72) Inventors: Juan Xu, Shanghai (CN); Jia Shi, Shanghai (CN); Lin Zhu, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/313,798

(22) Filed: May 8, 2023

(65) Prior Publication Data

US 2024/0378225 A1   Nov. 14, 2024

(51) Int. Cl.
*G06F 16/00* (2019.01)
*G06F 16/34* (2019.01)
*G06F 40/295* (2020.01)

(52) U.S. Cl.
CPC .......... *G06F 16/345* (2019.01); *G06F 40/295* (2020.01)

(58) Field of Classification Search
CPC .............................. G06F 16/345; G06F 40/295
USPC ....................................................... 707/722
See application file for complete search history.

(56) References Cited

U.S. PATENT DOCUMENTS

| | | | |
|---|---|---|---|
| 10,847,140 B1* | 11/2020 | Conner | G10L 15/1815 |
| 2003/0158725 A1* | 8/2003 | Woods | G06F 16/90344 |
| | | | 704/10 |
| 2005/0086224 A1* | 4/2005 | Franciosa | G06F 16/3334 |
| 2007/0239710 A1* | 10/2007 | Jing | G06F 16/951 |
| 2011/0072012 A1* | 3/2011 | Ah-Pine | G06F 16/54 |
| | | | 707/723 |
| 2011/0078162 A1* | 3/2011 | Nie | G06F 16/951 |
| | | | 707/754 |
| 2018/0096375 A1* | 4/2018 | Krentzman | G06Q 30/0214 |
| 2021/0295822 A1* | 9/2021 | Tomkins | G06F 40/289 |

* cited by examiner

*Primary Examiner* — Incent F Boccio
(74) *Attorney, Agent, or Firm* — Haynes and Boone, LLP

(57) ABSTRACT

There are provided systems and methods for sentence level dialogue summaries using unsupervised machine learning for keyword selection and scoring. A service provider, such as an electronic transaction processor for digital transactions, may provide computing services to users, which may be used to engage in interactions with other users and entities. When utilizing these services, memoranda may be generated that includes text from different online interactions. To provide summarization and searching of the memoranda, the service provider may implement an unsupervised machine learning framework that utilizes machine learning models to perform text preprocessing, keyword extraction, and keyword weighting when ranking and outputting relevant keywords. Once extracted and ranked, the keywords may be used to provide different insights to the memoranda. The keywords may be selected based on domains and tasks and the framework may be made pluggable and customizable for different systems and search operations.

20 Claims, 7 Drawing Sheets

Post-Candidate Extraction — 304

310: [ 'new arrivals marvel comics logo beautiful anime mouse mat popular computer' 'mousepad gamer halloween gift laptop pad mous']

314: [ 'Mouse Mat', 'mousepad', 'Laptop pad']

318: [ 'Marvel Comics']

Grammar selection — 308

NER selection with entity type A — 312

NER selection with entity type B — 316

Pre-Candidate Selection — 302

306:
New | PROPN | _ | O
Arrivals | PROPN | _ | O
Marvel | PROPN | ORG_B
Comics | NOUN | ORG_I
logo | NOUN | _ | O
Beautiful | PROPN | _ | O
Anime | PROPN | _ | O
Mouse | PROPN | PROD_CATE_B
Mat | PROPN | PROD_CATE_I
Popular | PROPN | _ | O
computer | NOUN | _ | O
gaming | VERB | _ | O
mousepad | NOUN | PROD_CATE_B
gamer | NOUN | _ | O
Halloween | PROPN | DATE_B
Gift | PROPN | _ | O
laptop | NOUN | PROD_CATE_B
pad | NOUN | PROD_CATE_I
mous | ADJ | _ | O

FIG. 3A

| Navigation 320 | Related Memos | Show Results 322 | |
|---|---|---|---|
| Keywords | | Transaction memo for selected keywords: software services, count: 61 | |
| invoice-26 | 129 | Seed Account Transaction ID | Transaction Memo |
| software services | 61 | | Software services |
| shopify project | 29 | | Invoice No: 1030 Software programming services |
| portal | 15 | | Invoice No:0105 Software programming service |
| mobile app development payment | 13 | | Invoice No: 0830 Software programming services |
| web work | 12 | | Invoice No: 1002 Software programming service |
| second milestones list | 6 | | Invoice No: 1120 Software programming services(pcs) |
| payment proj | 4 | | Invoice No:0105 Software programming service |
| project completed | 3 | | Invoice no: 0126, Software Programming Service |
| account program | 2 | | Programming Services |
| dev work jan | 2 | | Invoice No: 0201 Software programming services(pcs) |
| android maintenance contract | 2 | | Invoice no: 0225, Software programming services |
| niseko really website development | 2 | | Invoice no: 0225, Software programming services |
| | | | Invoice No: 1120 Software programming services(pcs) |

| Navigation — 330 | |
|---|---|
| Keywords | Related Transactions |
| alcohol | 2 |
| groceries | 12 |
| chipotle | 8 |
| birthday taco bell | 6 |
| happy valentines day xoxo | 4 |
| dinner | 4 |
| candy | 4 |
| notebook | 4 |
| pizzza | 2 |
| drinks | 2 |
| cat bed | 2 |
| room tax | 2 |
| misc. with friends | 2 |
| cash | 2 |
| delivery service | 2 |

334 ↗ (points to "alcohol" row)

Show Results — 332
Transactions for selected keywords: alcohol, count: 2

| Seed Account ID | Transaction ID | Transaction Memo |
|---|---|---|
| | | alcohol |
| | | alcohol |

336 (braces Transaction Memo column)

FIG. 3C

UNSUPERVISED MACHINE LEARNING MODEL FRAMEWORK FOR KEYWORD ANALYSIS IN REAL-TIME OF MULTILINGUAL DOCUMENTS

TECHNICAL FIELD

The present application generally relates to intelligent and automated keyword analysis and summary generations and more particularly to utilizing unsupervised machine learning (ML) models for comprehensive understanding and keyword searching in multilingual documents.

BACKGROUND

Service providers may have large computing systems and services that provide computing services, websites, applications, and interfaces for interactions with different end users, such as customers, clients, internal users and teams, and the like. For example, a service provider's computing system may have multiple different divisions and corresponding systems for data processing, storage, and use. Users within the different divisions may use different computing services and operations provided by the service provider, such as sending messages, viewing content and/or descriptions, corresponding with live or automated assistance and agents (e.g., live agents or chatbots), asking for assistance and/or information, and/or otherwise generating messages, documents, content, and/or other memoranda. For example, when using a user's digital account to perform electronic transaction processing through an online electronic transaction processor, messages may be exchanged, notes added to payments, item descriptions viewed, reviews and comments provided, and the like. When this occurs, user data for different text, images, video, audio, and the like, may be generated, which may be in multiple different languages. Thus, memoranda from text messaging, emails, push notifications, instant messaging, and other electronic communication channels may not be immediately searchable based on the multilingual format of the data. This requires internal teams of the service provider to separately review and provide summaries or other relevant data for searching and viewing, which is time consuming and requires manual effort.

For example, compliance investigations may be used to protect the business against financial crimes and compliance violation. In compliance case review, investigators manually check several types of memos including transaction memos, dispute memos, item descriptions, etc., which may be from a seed account or a group of accounts, for non-compliant or illegal activity and/or discussions. However, it is challenging for investigators to understand and review a corpus of memoranda data quickly and correctly. Individual memorandum may be generated by global users for different purposes and therefore differ in languages, intents, contents, and expressions, which makes capturing key information difficult. On the other hand, for each compliance case, the number of memoranda may be exceptionally large, varying from a couple to tens of thousands of individual documents or other text data, which makes missing key information easy. Therefore, it is very time-consuming and difficult for investigators to review them manually and requires significant computing resources to search and provide the individual documents and other data for review. This causes large burdens on search processing and document storage and retrieval systems. Thus, it is desirable for online service providers to generate and provide improved keyword analysis and searching for multilingual documents.

BRIEF DESCRIPTION OF THE DRAWINGS

FIG. 3A-3C are exemplary diagrams of resulting keyword analysis performed for multilingual documents using an unsupervised machine learning system, according to an embodiment;

Figure 1:
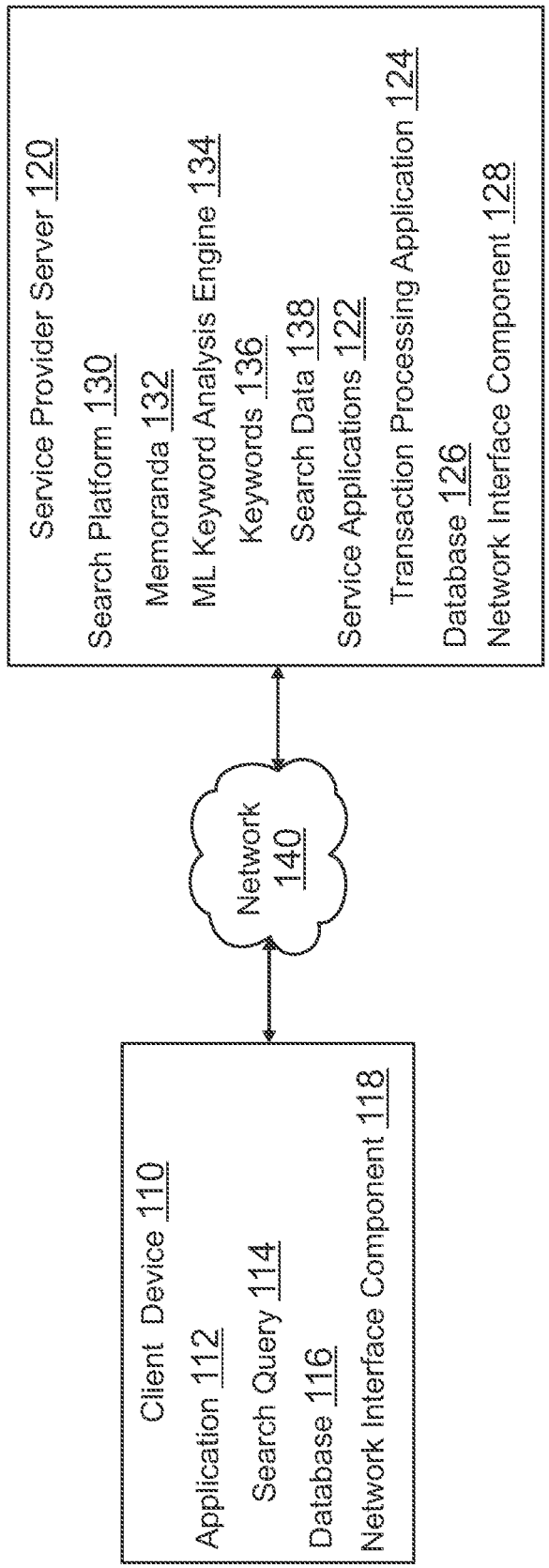
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a machine learning model framework (e.g., using unsupervised or supervised ML approaches and/or algorithms) for keyword analysis in real-time of multilingual documents. Systems suitable for practicing methods of the present disclosure are also provided.

In computing systems of service providers, computing services may be used for electronic transaction processing, account creation and management, payment and transfer services, customer relationship management (CRM) systems that provide assistance, reporting, sales, and the like, and other online digital interactions. In this regard, computing services and systems may provide communications via an email channel, a digital alert channel, a text message channel, a push notification channel, an instant message channel, or other messaging channel, as well as posted data for descriptions, blog or social media posts, microblogging, and the like. However, other dialogues and text data may also occur asynchronously and without live communications, such as when exchanging and/or providing data during electronic transaction processing. Thus, dialogues and exchanged text data between users (e.g., customers including merchants and individual users or buyers with an online transaction processor), merchants, sellers, live agents or chatbots (e.g., automated computing processes for responding to user requests and conversation), and the like may lead to memoranda (or memos) that provide information for the underlying interactions. For example, an online transaction processor may provide processes that generate memoranda during account setup, authentication, account usage (e.g., during electronic transaction processing), mobile device or application usage, payment information and/or service, and the like.

When providing these computing services that lead to memoranda generation, users and/or entities may desire to search memoranda and review or retrieve certain documents. Some memoranda or other text documents and data may be long, and review may take substantial time to read and determine previous issues, questions and queries, provided data and the like. Thus, in some embodiments, the service provider may provide a memoranda summarization and keyword analysis framework to provide keywords and/or a keyword summary of a corpus of memoranda or other documents by determining a number of most relevant or highest likelihood of interest keywords from multilingual and multidomain text documents and data. This may be determined using an unsupervised ML model combination to identify and rank keywords. Thereafter, each keyword and/or group of keywords (e.g., key phrases or sentences) may be scored and weighted. The keywords and phrases may be correlated and linked to documents through text matching and meaning matching, as well as other techniques. Once scored, the keywords and documents or other text data may be ordered according to scores, and a number of the keywords and/or documents that score the highest may be selected for use as a summary of the memoranda for the corpus, selected domain, task, or the like.

In this regard, a service provider may provide computing services to users including electronic transaction processing. For example, an online transaction processor (e.g., PayPal®) may allow merchants, users, and other entities to process transactions, provide payments, transfer funds, or otherwise engage in computing services. In other embodiments, other service providers may also or instead provide computing services for social networking, microblogging, media sharing, messaging, business and consumer platforms, etc. In order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate and/or process data, which may include text documents and/or data that may be included in a corpus of memoranda for a domain (e.g., business or service domain or category), user, merchant, communication channel, event, or the like. In order to provide widely available searching and summarization including in multiple languages and/or across multiple domains, the service provider may therefore provide an unsupervised ML framework implemented unsupervised ML models, techniques, and algorithms for keyword analysis, extraction, ranking, and use in summarization of the memoranda. When engaging in searching, the keywords may be then used for efficient and fast location and identification of memoranda and other text data of interest to a particular query, search term, keyword(s), and/or user task.

Thus, using the user's account (e.g., customer, merchant, agent, etc.), the user may generate text and memoranda via different computing services and in different domains. Each memorandum (or memo) may correspond to a text and/or other data document or file, or may correspond to text data that can be used to form a text file or data package. Memoranda in a corpus that is for a selected domain of use, type of data or messages, channel for data, interaction causing the generation of data, or other grouping may then be processed by translating the underlying text data into a single language. The language may correspond to the main language used and/or occurring in a portion of the corpus or may be a selected language for the search, keyword analysis, and/or summarization purposes. Thus, a default language may be selected or assigned, and a translation computing service may convert the text of the memoranda to a selected language (or combination of languages if selected for keyword analysis together).

Thereafter, the framework may be utilized to perform text preprocessing to convert the text to vectors, representations, and/or other data that may be used for keyword extraction. The framework may include an ML model pipeline to perform keyword extraction, scoring, and selection for a summary and searching. A memorandum may correspond to a collection of sentences or other groupings of words, where the words in sentences may be broken into individual words, phrases, and/or specific groups of words (e.g., for names, items, places, etc.). In some embodiments, the memoranda in a corpus may be limited to a number or past time period (e.g., a certain amount of time in the past, such as the last day, week, month, year, etc.) so as to limit a number of memoranda selected and processed. Keywords may assist in searching and summarizing this corpus, where keyword as used herein may also refer to multiple words grouped together in phrases or sentences and thus keyword may refer to a plurality of words. A summary of a corpus may include N number of keywords based on a keyword, phrase, or sentence level selection and ranking, a system configuration, scoring of sentences from the memorandum using keywords, and/or a length of the memorandum. In this regard, the ML model pipeline may initiate by executing a preprocessing of the memorandum for keyword selection and ranking that preprocesses the text data. The preprocessing may include general text cleansing, such as to remove artifacts and unwanted characters and/or words, encoding, sentence and word or groups of word identification using tokenization and punctuation (e.g., capitalization and punctuation marks), spelling and grammar correction, and the like. Filtering may include filtering out information noise that does not bring value, such as greetings and/or approvals, salutations, and/or other noise.

During preprocessing and keyword extraction and weighting, the ML model pipeline may implement a combination of unsupervised ML model algorithms to perform keyword level selection and/or extraction from the translated text data of the memoranda. The keyword level selection by the ML models seeks to identify keywords, such as words of importance that may be specifically targeted for an issue, repeated, identifying a specific issue or entity, and/or providing relevant or important data. In this regard, the ML model pipeline may be unsupervised in that the ML model pipeline may utilize a combination of ML model algorithms that does not require training and/or tuning and therefore the ML model pipeline may be considered unsupervised. Thus, the ML model pipeline may be copied and/or transported for use with different service providers, merchants, companies, and/or organizations.

When performing text preprocessing, tokenization may be used for natural language processing (NLP) tasks. Tokenization may be used to split sentences and paragraphs based on messages and memoranda into smaller units that may be assigned a meaning, such as based on the predicted intent of each unit. This allows for splitting the text data, after translation, into predictable and analyzable formats for use with additional preprocessing and extraction ML models. Thus, the data may be split into words, terms, sentences, phrases, symbols, and the like as individual tokens. Tokens may then be used to allow for understanding of how the words and/or groups of words interact and function in each memorandum and the corpus of memoranda. Thereafter, a token to vector operation, such as Tok2Vec, may be used to convert tokens to vectors. The vectors may correspond to a list, column, or mathematical representation of n-dimensions (e.g., depending on the words, letters, characters, location in the text, etc.). This allows for words and phrases to be represented in a manner that allows for similar meanings to be identified based on distances between the vectors and/or similarities between the vectors.

During data preprocessing, further steps may be performed with the translated text data prior to mining and extracting of keywords for keyword analysis and memoranda summarization. For example, parts-of-speech (POS) tagging may be performed in order to label words in text as a corresponding POS. This allows for each word to have relevant syntax and semantics within text during keyword extraction by allowing unsupervised ML algorithms and models to better understand the grammar and structure of the text. Thus, POS tagging may be used for candidate selection of keywords. Named entity recognition (NER) may also be performed that locates named entities (e.g., proper nouns and the like) mentioned in unstructured text. NER may further be used to tag or classify named entities into predefined categories. NER for named entities may include transaction identifiers, dates, amounts, persons, organizations, addresses, etc. in the memorandum. NER allows for named entities to be identified, highlighted, and/or provided with additional information of the named entities.

Thereafter, the framework may be used to perform candidate extraction of one or more keywords of interest using one or more unsupervised ML algorithms and/or models. Candidate extraction for keywords may correspond to a process to select words and phrases that may be used as a condensed summary of a corpus or other set of memos. An unsupervised ML model for grammar selection may not provide sufficient extraction where memos may have casual syntax or no syntax. Thus, a pluggable NER module may also be implemented that picks up desired entities in text regardless or organization, such as a product category, an organization category, a user category, or the like. An ML technique extracts keywords for the summarization and keyword analysis task being performed. This may be based on a specific category for named entities that may be set for the keyword extraction. Thereafter, the candidate selection may be customized and may be used to obtain an output list of keywords for weighting and ranking.

The ML model framework and pipeline may also apply additional unsupervised ML algorithms and techniques for filtering repeated information and/or weighting that information and keywords. For example, TextRank may correspond to a graph-based ranking model, which may process text to determine single words or groups of words of importance as keywords in the text. This allows for output of a number of highest-scored or ranked keywords, however, other ML techniques may also be used for keyword extraction. Once the keywords are determined, the ML models and framework may proceed to score the individual keywords, phrases, sentences or other groups of words. Thereafter, the keyword weighting and summarization engine of the service provider may weight and rank each keyword in order to obtain an ordered list of the keywords and keyword popularity, occurrence, importance, or scoring as relevant for the corpus of memoranda. In some embodiments, a combined score for the keywords in each group of words and/or sentences (e.g., a score, number, amount, or other ranking value) may also be used to score key phrases or sentences.

When performing candidate weighting and ranking for the keywords, an embedding-based maximal marginal relevance (MMR) unsupervised ML model and technique may be used for keyword ranking. MMR may consider similarities of keywords, phrases, and the like in a document with the similarity of already selected keywords to select or maximize a diversity of the results in the document. MMR may reduce redundancy of results and maximize diversity and may be used with EmbedRank or other ML models. With vectors generated from words, such as text embeddings, different expressions with the same or similar meaning may result in a same or similar vector. Thus, MMR may be used to control coverage and diversity with selected candidate keywords. However, MMR may not properly capture keywords that do not appear often or appear minimally but are of large importance for specific scenarios (e.g., fraud, money laundering, etc.). For example, violation keywords are specific and sensitive but may occur relatively little in a corpus of memoranda. Thus, a pluggable re-rank module may be implemented to re-rank results based on a particular business need, domain, task, or category. This allows weighting of certain keywords, such as violation keywords, based on domain knowledge of the domain for the memos instead of using computed score alone.

After scoring, document linking may be performed in order to link each keyword to semantically relevant memos from the corpus. Document linking allows for confirmation that the keyword is used saliently in the text of the memos for the corresponding reason and/or meaning, as well as is sufficiently found and in relevant or important locations to be of importance when searching and reviewing the memoranda. A two-step operation for document linking may be performed. First, a nearest neighbor of each candidate keywords/phrase may be determined via a semantic search. This may be done relying of lexical matches and the meaning of the queries and candidate keywords/phrases. The semantic search may be performed by computing cosine similarity between the queried keyword/phrase and all candidates in the corpus in batches during batching processing and selecting a top-N results as the nearest neighbors within a threshold distance. Second after the nearest neighbor search, a query expansion with the nearest neighbor may be performed to retrieve all relevant memos by text matching.

The keywords (and corresponding linked documents, in some embodiments) may then be sorted in descending order based on score, and N number of keywords may be selected as the top or highest scored. N may be set and/or tuned by an administrator, the user or entity requesting the summary, and/or a data scientist. For example, twenty may initially be set for performance and length, but N may be adjusted for a number of preferable keywords to review and for memo summarization. In some embodiments, the sorted list may further be adjusted based on rankings or scores attached to keywords. Post-processing and further filtering may also be applied in order to further refine the keywords and/or summary generation for a memorandum.

Thereafter, a summary for a memorandum may be generated with the keywords and/or documents based on the top-N highest scored keywords. The summary may select the N keywords and provide them in a user interface, window, selectable drop down or expandable menu, pop-up, or the like. Thereafter, feedback associated with one or more of the keywords and summarization of the memorandum may be checked from one or more databases so that if there are any disliked keywords, scoring may be adjusted. Similarly, if certain keywords were part of a liked summary, that may be used to boost or increase sentence scoring, and vice versa. Thus, the summary may be presented with the memorandum. Further, a score for each keyword may be presented, which allows the reviewer to view the relevance of each keyword and/or perform additional searching. The summary may also include the enriched information, such as the NER of named entities in the memorandum's sentences for the summary and/or part of speech tagging. The reviewer may provide feedback of whether keywords were relevant or not relevant and helpful or not helpful in the memorandum. Based on the feedback, the summarization engine may either re-rank keywords, re-score keywords, and/or remove irrelevant keywords, which allows the summary of the memorandum to be recreated in the user interface or window of presented to the agent. A database may further be provided to cache and/or store old summaries and provide again if needed. Further, the database may store the feedback, which may be used to train new models and/or when generating new summaries (e.g., to check if the memorandum had feedback and modify accordingly).

Thus, the unsupervised ML framework may be used to obtain the keywords and/or key phrases that best describe large sets of memo data and allow searching and/or summarizing of the memoranda. Further, the framework may be generalized and customizable for different purposes and focuses as required by the service provider. For example, in transaction memoranda review, violation indications may include sensitive information for the transaction that may violate service provider policy, such as for dispute memos where dispute reasons are the key information investigators are interested in. With this automated framework, the service provider may facilitate investigators when reviewing memos in a faster and more efficient manner, which further improves accuracy in data location and acquisition while avoiding missing valuable information hidden in the words of memos. This can improve operational efficiency and effectiveness.

In this manner, the service provider's system for automated keyword analysis and summary generation may expedite the generation of keywords used for searching and summarizing memoranda and/or a corpus having the memoranda, such as in conversational memorandum summaries and other search summarizations. These summaries and keyword generation of memoranda enable automated output of memos of interests with their keywords and summaries to new users, which facilitates faster provision of searchable data and more efficient search results and data location and presentations. The keyword analysis and summary may be generated quickly, without user input, and widely deployed in different computing channels and services to assist and improve search engines and search operations. Furthermore, a simplified interface may be provided to view, select, and interact with keywords from different memoranda in different domains and/or communications channels in a single language and/or without requiring translation while improving accuracy of keyword analysis operations and search engines. This may be done with a pluggable ML framework that does not require separate coding and creation by code and system developers.

By reducing the coding input and manual generation, computing resources required for individual keyword analysis solutions may be reduced. Thus, the following Figures and corresponding description present this pluggable ML framework implemented with different systems to provide keyword extraction, ranking, and searching within memoranda and other corpora of documents, text, and the like. The description of the figures herein may be utilized to train, implement, and execute such a framework using supervised and/or unsupervised ML models, which may provide keyword analysis and summary of text in different languages and with different structures, thereby providing an improved system for document searching and analysis.

FIG. 1 is a block diagram of a networked system 100 suitable for implementing the processes described herein, according to an embodiment. As shown, system 100 may comprise a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

FIG. 1 provides an overview of a system to implement ML models used for keyword summarization of corpora of documents including memoranda for keyword analysis in real-time. System 100 includes a client device 110 and a service provider server 120 in communication over a network 140. Client device 110 may be utilized by a user, customer, or entity to access a computing service or resource provided by service provider server 120, where service provider server 120 may provide various data, operations, and other functions to client device 110 via network 140. In this regard, client device 110 may be used to view, search, and/or browse, such as via keywords from keyword extraction and analysis with keyword and/or memoranda summarizations, memoranda generated from use of and/or interaction with these computing services. As such, service provider server 120 may provide keyword analysis and summarization of corpora of memoranda using an unsupervised ML model framework.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120 and other devices and/or servers. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute modules and associated devices of client device 110 to provide a convenient interface to permit a user for client device 110 to utilize services of service provider server 120, including computing services that may include viewing, browsing, and/or searching for memos and/or text within memos in one or more corpora of memos. Where service provider server 120 may correspond to an online transaction processor, the computing services may include those to enter, view, and/or process transactions, onboard and/or use digital accounts, and the like, which may cause generation of text data included in the memos when engaging in electronic transaction processing or other computing services associated with digital payment accounts, transactions, payments, and/or transfers. In this regard, application 112 may correspond to specialized hardware and/or software utilized by client device 110 that may provide transaction processing and other computing service usage through a user interface enabling the user to enter and/or view data, input, interactions, and the like for processing. This may be based on a transaction generated by application 112 using a merchant website or seller interaction, or by performing peer-to-peer transfers and payments with merchants and sellers. Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with service provider server 120.

In this regard, when browsing, searching, and/or viewing retrieved memoranda that have been summarized and/or made searchable using keyword analysis, application 112 may process and provide outputs associated with a search query 114. Search query 114 may correspond to text, images, audiovisual content, voice, and the like, which may be input as a query to be executed and search by service provider server 120 using a search system implementing keyword analysis and memoranda summarization from an unsupervised ML model framework discussed herein. Service provider server 120 may receive search query 114 with other search parameters and terms (e.g., a domain, search or memo category, time frame or window for memo searching, etc.), and may process to generate and provide search results and outputs including relevant keywords, linked memos, and the like, as discussed herein. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated software application of service provider server 120 or other entity (e.g., a merchant) resident on client device 110 (e.g., a mobile application on a mobile device) that is displayable by a graphical user interface (GUI) associated with application 112.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112, identifiers associated with hardware of client device 110, or other appropriate identifiers, such as identifiers used for payment/user/device authentication or identification, which may be communicated as identifying the user/client device 110 to service provider server 120. Moreover, database 116 may include information for search query 114 and/or results of search query 114, which may be presented and/or output via application 112.

Client device 110 includes at least one network interface component 118 adapted to communicate with other computing devices, servers, and/or service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services, including electronic transaction processing, via network 140. In this regard, service provider server 120 includes one or more processing applications which may be configured to interact with client device 110 to provide data, user interfaces, platforms, operations, and the like for the computing services to client device 110, as well as facilitate search services using keyword analysis and summarization through a pluggable ML framework including one or more ML models. The computing and search services may be for CRM systems that provide customer services and/or electronic transaction processing, such as for an online transaction processor corresponding to service provider server 120. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a search platform 130, service applications 122 having a transaction processing application 124, a database 126, and a network interface component 128. Search platform 130, service applications 122, and transaction processing application 124 may correspond to executable processes, procedures, and/or applications with associated hardware. In other embodiments, service provider server 120 may include additional or different modules having specialized hardware and/or software as required.

Search platform 130 may correspond to one or more processes to execute modules and associated specialized hardware of service provider server 120 to provide a platform to for keyword analysis, insights, and summarization for corpora of memoranda for service provider server 120. In this regard, search platform 130 may correspond to specialized hardware and/or software used by service provider server 120 to process memoranda 132 from use and/or interaction with service applications 122 by users, which may be used by those users or other users and entities for memo searching, browsing, and/or summarizing through keywords (including single words, phrases, sentences, and the like). This may be done using an ML keyword analysis engine that outputs keywords 136 and allows searching using keywords 136 with search data 138, such as a search query 114 from client device 110. In this regard, search platform 130 may interact with service application 122 to collect, aggregate, and/or access memoranda 132, which may be in one or more corpora and may have a corresponding domain, category, communication channel, or the like. Memoranda 132 may be generated via interactions, inputs, navigations, browsing or viewings, and the like for text data that may occur via online platforms, computing services, communication channels (e.g., an email channel, a digital alert channel, a text message channel, a push notification channel, an instant message channel, or other messaging platform), and the like.

Memoranda 132 may therefore include text data of text from interactions, inputs, posted data, and the like that may occur over a period of time (e.g., days, weeks, months, etc.) and may occur in a particular business or computing domain, category, and/or communication channel or medium of service applications 122, as well as other external or third-party computing services. In order to provide keyword analysis and summaries for memoranda 132, ML keyword analysis engine 134 may be implemented and executed for keyword generation using one or more ML models. Such models may be unsupervised in that the ML models do not require training using annotated or labeled data and may be pluggable and usable with different keyword analysis and summarization tasks and services for different domains, categories, tasks, and the like (e.g., based on multilingual text data). ML keyword analysis engine 134 may execute ML models to generate keywords 136 for memoranda and other dialogues, which may include text in different languages.

In various embodiments, ML keyword analysis engine 134 includes ML models that may be used for intelligent decision-making and/or predictive outputs and services, such as during the course of providing keyword analysis, insights, and summarization services for memoranda 132. Thus, ML models may provide a predictive output, such as a score, likelihood, probability, or decision, associated with keyword level selection, such as selection and identification of keywords in one or more of memoranda 132, and those keywords corresponding ranking or score within the documents. ML models may employ a combination of different ML model algorithms including unsupervised ML models, algorithms, and techniques for text data processing. Although unsupervised ML model algorithms are discussed herein, it is understood and supervised and/or custom-trained ML models and corresponding algorithms may also be used.

For example, ML keyword analysis engine 134 may include ML or neural network (NN) models trained for intelligent decision-making and/or predictive outputs (e.g., scoring, comparisons, predictions, decisions, classifications, and the like) for particular uses with computing services provided by service provider server 120. When generating ML model algorithms used to create ML models, data may be used to generate one or more classifiers that provide recommendations, predictions, or other outputs based on those classifications and an ML or NN model algorithm. ML models may be unsupervised, and thus training and re-training or adjustment may not be required by service provider server 120. In this regard, service provider server 120 may implement one or more unsupervised ML model algorithms to generate ML models that correspond to an unsupervised ML model framework for keyword level selection in memoranda 132. The ML model may implement a pipeline of multiple ML models for preprocessing text data, keyword level selection, keyword weighting and ranking, and the like may therefore include a combination of unsupervised ML model algorithms to properly select, extract, and/or determine keywords and keywords rankings in a document or corpus of documents for all or a portion of memoranda 132.

When initially configuring unsupervised ML model algorithms, data may be used to determine input features and utilize those features to generate decision trees, clustering, vectorization, similarity score calculation, or other decision-making architectures based on the input features. For example, ML models may include one or more layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used for the ML model algorithms using feature or attribute extraction for input data.

Thereafter, the hidden layer may be generated with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that provide an output, classification, prediction, or the like. Thus, when the ML models are used to perform a predictive analysis and output, the input may provide a corresponding output based on the classifications trained for the ML models.

By providing input data when generating the ML model algorithms for ML keyword analysis engine 134, the nodes in the hidden layer may be adjusted such that an optimal output (e.g., a classification) is produced in the output layer. By continuously providing different sets of data and penalizing ML models when the output of ML models is incorrect, the ML model algorithms for ML keyword analysis engine 134 (and specifically, the representations of the nodes in the hidden layer) may be adjusted to improve its performance in data classification. This data classification may correspond to selection and ranking of keywords. Using the ML model algorithms, ML keyword analysis engine 134 may be created to perform intelligent decision-making and predictive outputs. This may include generation of keywords 136 by ML keyword analysis engine 134.

Thus, keywords 136 may be generated by taking memoranda 132 corresponding to a document or corpus of documents having text from online interactions, communications, and other data from service applications 122 and/or other external or third-party sources. The text may be in multiple languages and therefore may be translated from multilingual text data in memoranda 132 to a target language and/or preferred language from memoranda 142. The translated text may be filtered by ML keyword analysis engine 134 and preprocessed, such as to provide general text cleansing, filtering noise, and the like. Further, ML keyword analysis engine 134 may perform text preprocessing in order prepare the text data for keyword extraction after translation, such as by performing tokenization operations to tokenize words and/or groups of words, convert tokens to vectors using Tok2Vec or other vectorization operation, perform POS tagging for different parts of speech in the text data, and/or performing NER for named entities.

Once preprocessed, ML keyword analysis engine 134 may execute ML models with the text data to determine keywords and keyword rankings. This may utilize an unsupervised ML model pipeline of ML keyword analysis engine 134 for keyword level selection. ML models may include an ML model algorithm to identify particular keywords and/or an ML model algorithm to ranking, sort, or score keywords by their particular occurrence within documents, or other text making up the translated and preprocessed text data from memoranda 132. ML models may further use a pluggable NER selection module, a grammar selection operation, an embedding-based MMR or other MMR operation or technique, a re-ranking module for re-ranking based on domain knowledge, a semantic search operation (which may include computing cosine similarity, selecting a top-N result set, and performing query expansion), and/or a top-N keyword selection to select and rank keywords and phrase extractions, which may be used to determine keyword rankings, scores, or other values for the keywords that have be selected and identified in memoranda 132.

After executing ML models, ML keyword analysis engine 134 may further perform a scoring and ranking operation for output and/or summarization. During the ranking operation, ML keyword analysis engine 134 may rank according to scores for a top-N number of keywords, where N is configurable for ML keyword analysis engine 134, the keyword task or domain for memoranda 132 or a set being processed, or based on other parameters for keyword summarization and search. In various embodiments, the ranking operation may also consider the rank of each keyword in the sentences, paragraphs, or other text of memoranda 132. ML keyword analysis engine 134 may sort the keywords in descending order and select N number of highest scored keywords for summaries. N may be tunable and/or may be automatically selected.

ML keyword analysis engine 134 may then output keywords 136 with summaries for use with a search engine, application, and/or system for memoranda 132, which may be used internally or externally by different users and entities. Summaries may list keyword 136 in descending order, based on timestamp (e.g., oldest to newest or vice versa), and/or based on score. Search queries and requests may be received, such as search query 114, which may result in generation of search data 138 for search results using the keywords and insights gained from keyword analysis. Search data 138 may be output to one or more users based on the requests, such as on client device 110 responsive to search query 114. This allows the user viewing search data 138 to quickly become familiar with the issues and information from memoranda 132, as well as view and browse memoranda 132 including by keywords 136. Further, the user may interact with search data 138 to provide feedback, such as by re-ranking keywords 136, noting certain ones of memoranda 132 and/or keywords 136 as important or unimportant, and/or requesting additional data, which may be used to update keyword rankings and/or summaries.

Service applications 122 may correspond to one or more processes to execute modules and associated specialized hardware of service provider server 120 to process a transaction or provide another service to customers or end users of service provider server 120. For example, transaction processing application 124 may correspond to specialized hardware and/or software used by service provider server 120 to providing computing services to users, which may include electronic transaction processing and/or other computing services provided by service provider server 120, such as in response to receiving transaction data for electronic transaction processing of transactions initiated using digital wallets. In some embodiments, transaction processing application 124 may be used by users, such as a user associated with client device 110, to establish user and/or payment accounts, as well as digital wallets, which may be used to process transactions. Accounts may be accessed and/or used through one or more instances of a web browser application and/or dedicated software application executed by client device 110 and engage in computing services provided by transaction processing application 124.

In various embodiments, financial information may be stored to the account, such as account/card numbers and information. A digital token for the account/wallet may be used to send and process payments, for example, through an interface provided by transaction processing application 124 or another one of service applications 122. The payment account may be accessed and/or used through a browser application and/or dedicated payment application executed by client device 110 and engage in transaction processing through transaction processing application 124. Transaction processing application 124 may process the payment and may provide a transaction history to client device 110 for transaction authorization, approval, or denial. In other embodiments, service applications 122 may instead provide different computing services, including social networking, microblogging, media sharing, messaging, business and consumer platforms, etc. Such services may be utilized through user accounts, websites, software applications, and other interaction sources, which may be used when memoranda 132 are generated, viewed, and/or communicated.

Service applications 122 may also provide additional features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider server 120, where the user or other users may interact with the GUI to more easily view and communicate information. In various embodiments, service applications 122 may include additional connection and/or communication applications, which may be utilized to communicate information to over network 140.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data, as well as transactions, transaction results, and other data generated and stored by service applications 122. Further, database 126 may include memoranda 132 having text, images, audiovisual content, and the like from online interactions. In this regard, keywords 136 may also be stored after processing of memoranda 132 using ML keyword analysis engine 134.

In various embodiments, service provider server 120 includes at least one network interface component 128 adapted to communicate with client device 110 and/or other computing devices and servers directly and/or over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
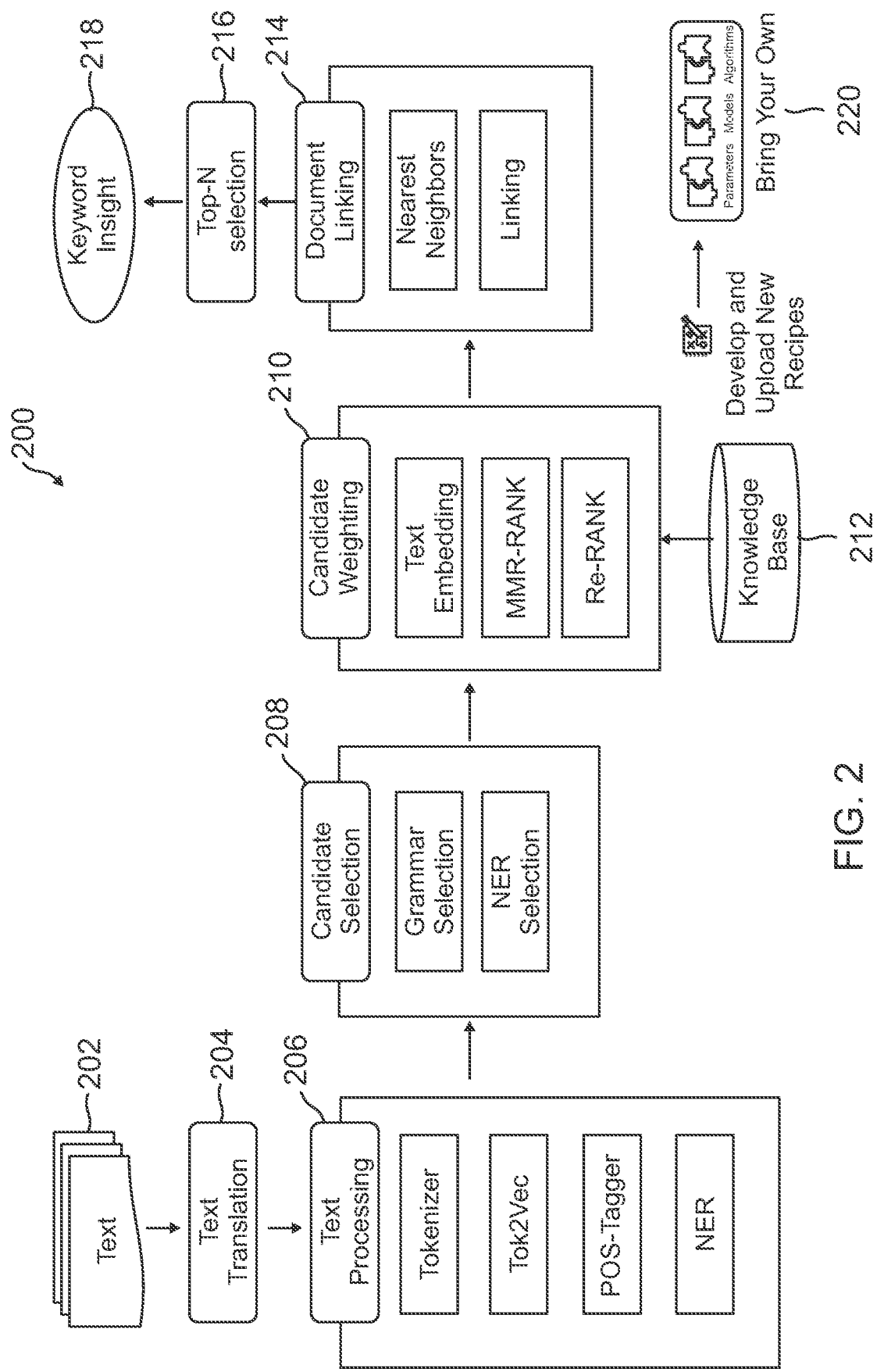
FIG. 2 is an exemplary system environment for performing keyword analysis with multilingual documents using an unsupervised machine learning model framework, according to an embodiment.

FIG. 2 is an exemplary system environment 200 for performing keyword analysis with multilingual documents using an unsupervised machine learning model framework, according to an embodiment. System environment 200 of FIG. 2 includes components of an unsupervised ML model framework for providing keyword analysis of memoranda and other text data, such as components of ML keyword analysis engine 134 of service provider server 120 from system 100 of FIG. 1. In this regard, text 202 may be provided as input to the framework and ML models in system environment 200 for a keyword insight 218 of keywords determined from text 202 using the unsupervised ML model framework and pipeline of ML models.

In system environment 200, keywords may be determined from text 202 for memos and other documents, files, messages, or other text data, such as those in a large set of unstructured memos in different domains. This may be performed automatically with business needs accounted for in the resulting keyword analysis. The unsupervised ML model framework may not only provide a list of keywords/phrases that describe the subjects of the memos but also links each of the keywords/phrases with their semantically relevant memos. Thus, keyword insight 218, once generated, may provide business-related insight in addition to the keywords and summarizations based on utilizing domain knowledge, and further users may quickly locate the relevant memos for validation using the keywords, summarizations, and search operations. For example, data and/or crime analysts may quickly obtain key subject or business-related information without reviewing each of memorandum manually for a financial crime investigation and/or compliance review, which assists investigators in efficiently reviewing memos and avoiding missing important information. The framework, by utilizing unsupervised models and techniques, may generalize well on several types of memos and users may easily customize the solution with different purposes and focuses. This also simplifies algorithm adoption for better optimization and fine-tuning to achieve better performance and provides a pluggable solution framework for keyword analysis of keyword insight 218. Thus, a machine learning engineer may customize the algorithms or parameters via the framework configuration without knowing all the engineering details.

Text 202 is processed using a text translation 204 to translate multilingual memos, text documents, and other text data to a single language or subset of languages that are used for ML model processing and predictive keyword generation and analysis. The default language may be English for English speakers and/or searchers (or similar language selection for the users viewing and interacting with keyword insight 218), a dominant or majority language used in the memos, and/or another select language or set of languages which are of interest and/or used by the search engine. After text translation 204, a text processing 206 is used to provide preprocessing and preparation of text for analysis and keyword extraction.

Text processing 206 may include tokenization via a tokenizer, Tok2Vec (token to vector operations for converting tokens to vectors), POS tagging, named entity recognition (NER) of named entities, and the like. Tokenization may be performed with NLP operations to convert text data to data strings, representations, numeric or alphanumeric identifiers or tokens, and the like. This may split paragraphs and sentences into smaller units and assign those units a token representation. Thus, the text from the memos may be split to allow for machine processing. Tok2Vec may convert the tokens to a particular list of numbers, such as vectors of n-dimensionality where n represents the number of data points or features used for the vectors. Thus, words written in different expressions (e.g., slang, abbreviations, or typo errors) may be converted to have the same or similar meanings by computing distances between the vectors. This may also benefit downstream NLP taskings including POS tagging and NER. POS tagging may label words and phrases in text with a corresponding particular POS tag. NER may locate and identify named entities in unstructured text data and classify such identified named entities into categories. This may be a pluggable feature to help extract qualified candidate words when the memos lack syntax rules.

After text processing 206, candidate selection 208 may select initial candidate keywords (or phrases, sentences, etc.) prior to ranking those keywords based on usefulness, salience, and/or meaning for memoranda in text 202. In this regard, candidate selection 208 may correspond to executable operations to perform a grammar selection, NER selection, and/or other keyword extraction operation. Candidate selection 208 may select candidate words and phrases that may provide a highly condensed summary for a large set of memos. Grammar selection may be implemented as a default method for keyword extraction. However, with casually written memos and/or those that do not follow grammar and/or syntax rules, a pluggable NER selection module may be implemented. This component may identify desired entities in the text regardless of whether the text is well organized or not. For instance, the text phrase (e.g., from keywords 310 in FIG. 3C) "*New Arrivals Marvel Comics logo Beautiful Anime Mouse Mat Popular computer gaming mousepad gamer Halloween Gift laptop pad mouse*" is disorganized and/or does not adhere to conventional grammar, punctuation, syntax, and other grammatical rules. If product categories are of interest in that text phrase, such as "Mouse Mat," extraction may be difficult using grammar selection alone. Instead, keywords may be extracted with NER selection by limiting the target named entities to "product category." Similarly, by changing the target entity to "organization," "Marvel Comics" may result. Therefore, the pluggable module may allow candidate selection that may be well generalized to different keyword analysis and summarization tasks, and users may easily customize the solution based on their purposes and keyword interests.

A candidate weighting 210 may then be used, which may access and use data from a knowledge base 212 for a domain of text 202 and/or of interest for the keywords. Candidate weighting 210 weights and ranks all candidate keywords based on occurrences of those words, phrases, or the like in text 202. Candidate weighting 210 may use embedding-based Maximal Marginal Relevance (MMR) as the default ranking technique and operations. Using text embedding (e.g., conversion of unstructured text data to structured embeddings, encodings, or vectors), different expressions with the same meaning may have a same or similar resulting vector. MMR may also control the coverage and diversity among the selected candidate keywords. However, with words or phrases that appear uncommonly or little at all in the large set of memos but are extremely important to users in specific scenarios (e.g., fraud, illegal activity, money laundering, etc., which may only have one or a few instances of use of terms that indicate such illegal or illicit behavior). For instance, in transaction memo review, violation keywords may be very sensitive information that are key clues for policy and/or law violation but may occur very infrequently in memoranda for a domain, communication channel or format, etc. Thus, a pluggable re-rank module may be implemented that may leverage domain knowledge or other algorithms from knowledge base 212 to re-rank the result of keyword extraction and ranking based on the user's or entity's business need or the like for keyword insight 218 and/or search and summarization services. For example, the re-rank module may increase the weight of the violation keywords based on domain knowledge rather than relying exclusively or mainly on the score computed by MMR. Thus, users may customize the solution based on their purposes without missing any vital information for keyword insight 218.

During a document linking 214, memoranda and other documents, messages, or the like from text 202 may be linked to their corresponding keywords based on occurrences of the keywords in the documents. Document linking 214 may therefore correspond to a process to link each keyword to semantically relevant memos from text 202. There may be a requirement to determine that keywords occur sufficiently enough and are salient throughout memos and the like for text 202. This may also assist investigators with notes for specific memos having the keywords. This may be performed using a multi-step operation. For example, first document linking 214 may retrieve the nearest neighbors of each candidate keyword via semantic search. These may be found not only by relying on lexical matches but also using a meaning of both queries and candidate keywords.

To do so, the cosine-similarity may be computed between the query and all candidate keywords and key phrases in the corpus in batches. The top-N result may be selected as the nearest neighbors within a threshold. Thereafter, for each word/phrase, query expansion may be performed with their nearest neighbors and all relevant memos may be retrieved via text matching. Thereafter, a top-N selection 216 may be performed to obtain keyword insights 218. Top-N selection 216 may output the top-N highest weighted keyword selected from the prior steps, where the higher the score, the stronger the importance in keyword summarization of text 202 for keyword insights 218. With the framework in system environment 200, pluggable components 220 may also be provided where users may provide their own parameters, models, and/or algorithms to customize the framework. Thus, pluggable components 220 may be used to provide customization and allow plugging of the framework into different scenarios, uses, search and summarization systems, and the like.

FIG. 3A-3C are exemplary diagrams 300a-300c of resulting keyword analysis performed for multilingual documents using an unsupervised machine learning system, according to an embodiment. Diagrams 300a-300c include input and results for memoranda and other text data processed by service provider server 120 discussed in reference to system 100 of FIG. 1. In this regard, service provider server 120 may output keywords for summarization and keyword insights for the memoranda in a corpus that is processed using an unsupervised ML model framework.

In diagram 300a, pre-candidate selection 302 displays text input that results in keywords for post-candidate extraction 304 from an unsupervised ML model framework and based on different unsupervised ML models and techniques. In this regard, diagram 300a utilizes different ML processes with preprocessed text data 306, which may result from translating and preprocessing (e.g., using tokenization, Tok2Vec, POS tagging, NER, and the like) of text data from memoranda or other text documents and sources. For example, using a grammar selection 308, preprocessed text data 306 may include keywords 310 using a grammar selection ML model. For example, keywords 306 in text 310 includes: "*New Arrivals Marvel Comics logo Beautiful Anime Mouse Mat Popular computer gaming mousepad gamer Halloween Gift laptop pad mouse.*" Thus, grammar selection 308 for keywords 306 in text 310 may include "new arrivals marvel comics logo beautiful anime mouse mat popular computer" and "mousepad gamer Halloween gift laptop pad mouse."

However, grammar selection 308 may not be sufficient alone for keyword extraction. Thus, an NER selection with entity type A 312 may also be used, where A for the entity type may be "product category". NER selection with entity type A 312 results in keywords 314, which include "mouse mat," "mousepad," and "laptop pad." This keyword extraction identifies product categories and may use the aforementioned pluggable NER module. With NER selection with entity type B 316, where the entity type has been changed to organization, keywords 318 may be generated for post-candidate extraction 304 that include "Marvel Comics." Thus, different keywords may be extracted depending on the domain knowledge and requirements for keyword analysis, insights, and summarization using the flexible ML framework.

In diagram 300b, an exemplary layout, interface, or presentation of keyword browsing and searching for related or linked memos is shown. Navigation 320 allows for navigation to and viewing of different memoranda 326 in results 322 for keywords 324. In this regard, diagram 300b may be used to view relevant memoranda regarding transactions, such as when investigating expenses, determining budgets, performing accounting, or the like. Thus, as an accountant, investigator, manager, or other user may select "software services" from keywords 324, the user may view memoranda 326 linked to "software services", which presents memoranda 326 in results 322. This allows the user to view, search, or otherwise utilize those relevant memos. In diagram 300c, similarly, another exemplary layout, interface, or presentation of keyword browsing and searching for related or linked memos is shown, where navigation 330 allows for viewing of results 332 of memoranda 336 from keywords 334. However, the user viewing diagram 300c may be searching for illicit or illegal activity, which may occur infrequently in the memoranda. Using the ML model framework described herein, these keywords of importance may still be extracted and searchable. Thus, through selection of one of these in keywords 334, memoranda 336 may display, in results 332, the linked text, documents, or the like of the few but important occurrences of such keywords.

Figure 4:
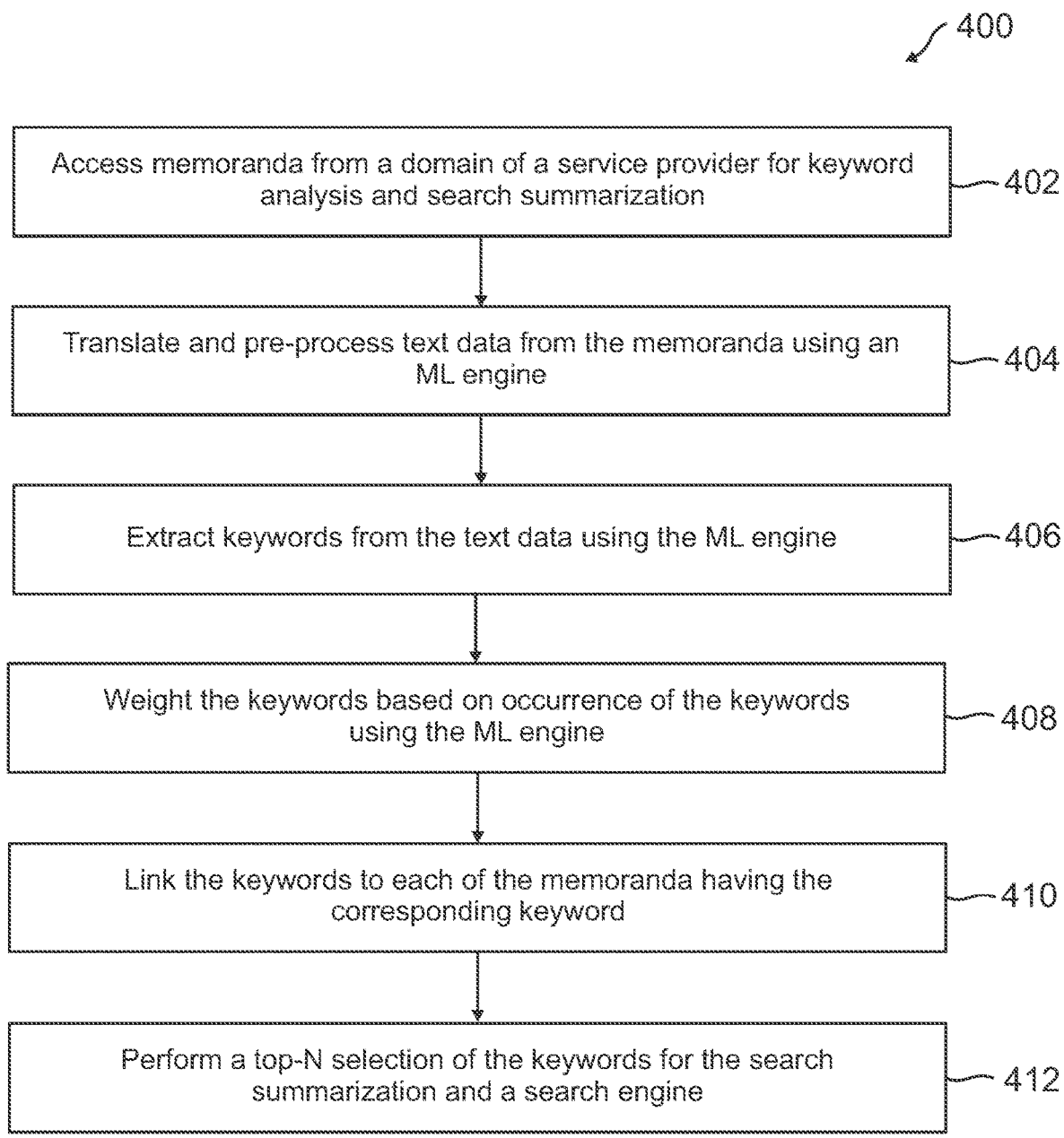
FIG. 4 is a flowchart for execution by an unsupervised machine learning model framework for keyword analysis in real-time of multilingual documents, according to an embodiment.

FIG. 4 is a flowchart 400 for execution by an unsupervised machine learning model framework for keyword analysis in real-time of multilingual documents, according to an embodiment. Note that one or more steps, processes, and methods described herein of flowchart 400 may be omitted, performed in a different sequence, or combined as desired or appropriate.

At step 402 of flowchart 400, memoranda from a domain of a service provider for keyword analysis and search summarization are accessed. The memoranda may be generated from interactions and activity of users online and may correspond to one or more documents including text having a plurality of sentences or groups of words (e.g., phrases or sections of sentences). The memoranda may correspond to a chat, conversation, exchange of messages, or the like, as well as data from descriptions, posts, provided data, and the like. The dialogue may be collected in a single document or a corpus of documents for processing.

At step 404, text data from the memoranda is translated and preprocessed. Translation may be performed to convert the text data to a single or set of languages selected or preferred for the task being performed during the memoranda keyword analysis and summarization. The preprocessing may correspond to general text cleansing and the like that allows for artifacts, typos, and other errors in grammar or syntax to be resolved so that proper processing of the text from the dialogue may be accomplished. Filtering may be executed to remove sentences and word groupings that are unnecessary, irrelevant, or provided little to no value in the overall dialogue. The filtering may therefore be used to remove sentences that may otherwise cause inconsistent or incorrect results or add no additional information. Preprocessing may also be performed to obtain processable data for ML models, such as when processed using a pipeline of unsupervised ML models for an unsupervised ML model framework. Thus, the preprocessing may include a tokenization of the text data, a conversion of tokens from the tokenization to vectors, a part of speech tagging in the text data, or an NER of named entities in the text data.

At step 406, keywords from the text data are extracted using an ML engine, such as using an unsupervised ML model combination. The keyword selection and extraction may be performed by executing a pipeline of unsupervised ML model algorithms to identify keywords and rank the keywords for importance or relevance in the dialogue. The keyword level selection may be performed by the unsupervised ML model, such as a pluggable NER selection module that identifies selected and desired entities based on an identifier, category, domain, or the like. However, other unsupervised ML models may be used including a grammar selection, a RAKE algorithm, a TF-IDF algorithm, a TextRank algorithm, and a noun phrase extraction algorithm. Using the unsupervised ML models, an output of keywords may be provided. With supervised ML models, trained decision trees and decision tree algorithms, and the like may be used for keyword analysis and extraction.

At step 408, the keywords are weighted based on occurrences the importance of the keywords and the domain knowledge of the keywords using the ML engine. For example, keywords in each sentence are calculated and identified, and the keywords are scored based on their occurrences and/or an embedding-based MMR technique. A number of keywords may be identified, and each keyword may be provided a value based on their keyword rankings. Using the number of keywords and their corresponding values, each keyword may also be re-ranked using a re-rank module that utilized a business need, domain knowledge, or the like to re-rank keywords based on preset parameters and keyword weighting settings. The score may represent how relevant each keyword is in the corpus of memoranda.

At step 410, the keywords are linked to each of the memoranda having the corresponding keyword. Keyword linking may be performed by confirming each keyword is salient in the memos and utilized for the intended or analyzed purpose. Thus, a semantic search may be executed for each keyword using a cosine-similarity with the query and all keywords, where top-N results within a threshold are selected. The semantic search may also implement a query expansion with the nearest neighbor to relieve all relevant memos by text match.

At step 412, a top-N selection of the keywords is performed for the search summarization and search engine. The summary may select N number of highest scored sentences and may list such selections. The summary and keywords (as well as any ranking) may be output, such as to a searching user when utilizing a search system implementing the keyword analysis and summarization. In a user interface displaying the summary and keywords, the user may also be provided options to provide feedback in order to view additional data regarding the memoranda and/or re-rank keywords.

Figure 5:
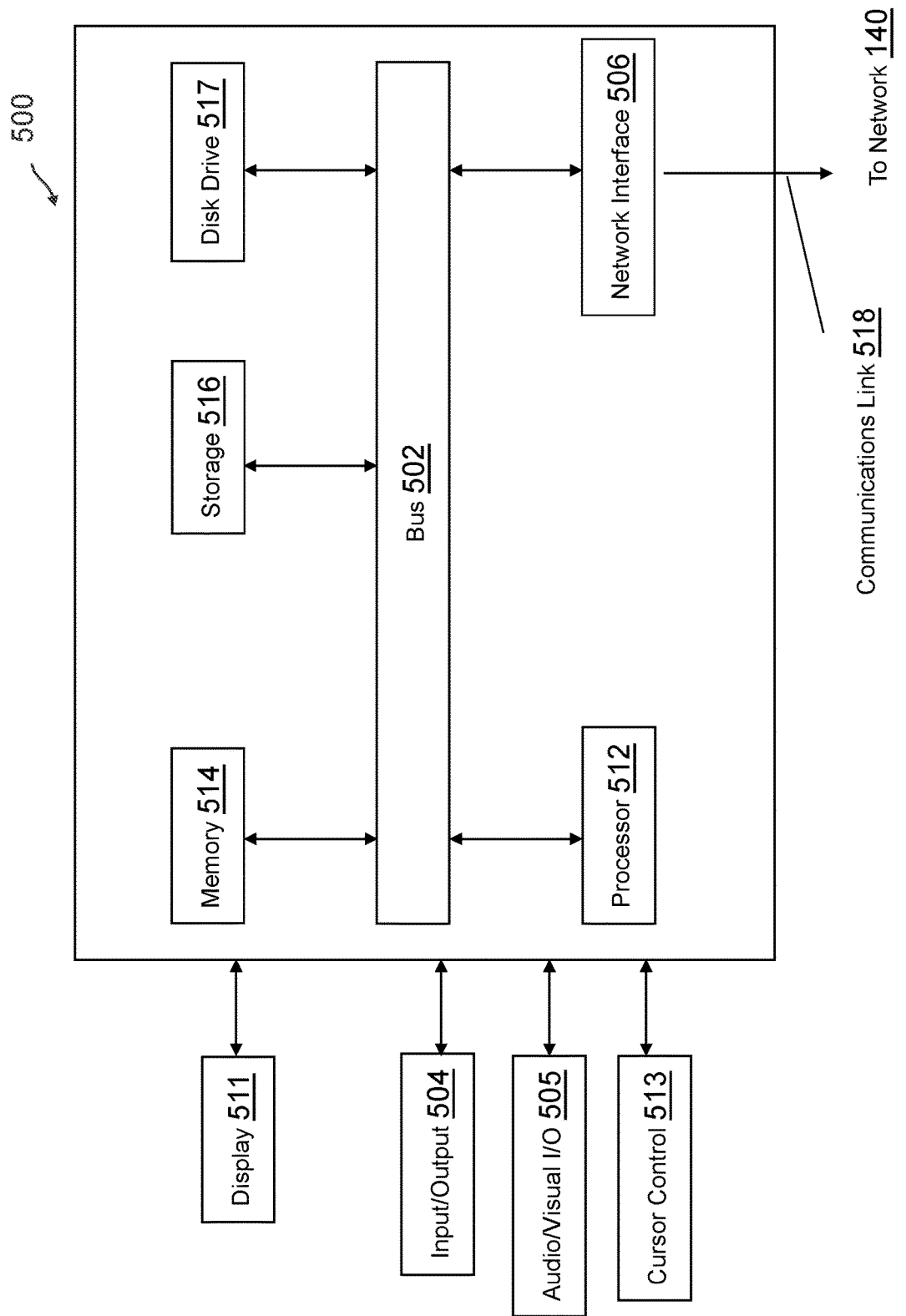
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s)

512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
  receiving a corpus of documents having text data from a plurality of sources that enable a generation of the documents in the corpus;
  determining a domain having computing services that generate the documents in the corpus, wherein the computing services utilize the plurality of sources for the generation of the documents;
  determining a named entity recognition (NER) selection module of a plurality of NER modules based on the domain, wherein the NER selection module enables identifications of different named entities found in the corpus based on a keyword analysis task associated with the domain and a category for the domain;
  executing an unsupervised machine learning (ML) framework comprising the NER selection module and at least one unsupervised ML model configured for keyword analysis of the documents;
  performing a keyword extraction of the documents in the corpus for a plurality of keywords based on the executing of the unsupervised ML framework, wherein the plurality of keywords include at least one of the different named entities;
  weighting, based on the executing of the unsupervised ML framework, the plurality of keywords from the keyword extraction based on an occurrence of each of the plurality of keywords in the documents;
  determining a keyword weighting setting associated with the domain in which the corpus of documents was generated for a service provider, wherein the keyword weighting setting indicates an elevated importance of one of the plurality of keywords for the domain;
  reweighting at least one of the plurality of keywords based on the keyword weighting setting and a frequency that the one of the plurality of keywords occurs in the corpus of documents; and
  outputting, based on the weighting and the reweighting, a searchable summarization of the corpus comprising the reweighted plurality of keywords, wherein the searchable summarization provides a search function of the plurality of keywords in the documents and correlations between each of the documents that are based on the occurrence of each of the plurality of keywords in each of the documents.

2. The system of claim 1, wherein the documents comprise memoranda in a plurality of languages, and wherein, prior to the performing the keyword extraction, the operations further comprise:

translating the text data from the memoranda to one of the plurality of languages selected for the keyword extractions.

3. The system of claim 1, wherein, prior to the performing the keyword extraction, the operations further comprise:
performing, on the text data, one or more text preprocessing operations comprising at least one of a vector generation from the different named entities, tokens of the text data, or parts of speech in the text data.

4. The system of claim 1, wherein the NER selection module extracts targeted named entities selected for the searchable summarization based on the keyword analysis task and the category for the different named entities.

5. The system of claim 1, wherein the weighting of the plurality of keywords comprises:
generating, based at least on the plurality of keywords, text embeddings of the text data in the documents;
performing a maximal marginal relevance ranking of the plurality of keywords based on the text embeddings; and
executing a pluggable re-rank module for the maximal marginal relevance ranking of the plurality of keywords based on a selected business domain associated with the documents.

6. The system of claim 1, wherein, prior to the outputting the searchable summarization, the operations further comprise:
performing a document linking of each of the plurality of keywords to one or more of the documents based on the occurrences of the plurality of keywords in the documents via a nearest neighbor semantic search and a query expansion on the nearest neighbor semantic search.

7. The system of claim 6, wherein the nearest neighbor semantic search utilizes a cosine-similarity between queries for the plurality of keywords and the documents and a top-N result selection for a highest-ranking N number of results.

8. The system of claim 1, wherein, prior to the outputting the searchable summarization, the operations further comprise:
ranking the reweighted plurality of keywords based on a keyword ranking parameter for the plurality of keywords; and
selecting a top-N number of the plurality of keywords for the searchable summarization based on the ranking, wherein the unsupervised ML framework is pluggable for a search engine of the system for at least the documents, and wherein the top-N number is variable and established for the unsupervised ML framework when implemented with the search engine.

9. The system of claim 1, wherein the plurality of keywords include phrases having two or more of the plurality of keywords.

10. A method comprising:
receiving a plurality of text documents from digital interactions by at least one user with an online service provider, wherein the plurality of text documents include text in at least one language, and wherein the digital interactions occur via at least one communication channel;
determining a domain having computing services that utilize the plurality of text documents with the at least one communication channel;
determining a named entity recognition (NER) selection module of a plurality of NER modules based on the domain, wherein the NER selection module enables identifications of different named entities found in the plurality of text documents based on a keyword analysis task associated with the domain and a category for the domain;
executing an unsupervised machine learning (ML) framework comprising the NER selection module and at least one unsupervised ML model configured for keyword analysis of the plurality of text documents;
preprocessing the text from the plurality of text documents based on the executing of the unsupervised ML framework;
extracting, based on the executing of the unsupervised ML framework, a plurality of keywords from the preprocessed text;
determining, based on the executing of the unsupervised ML framework, a ranking of the plurality of keywords for the plurality of text documents based on a weighting of the plurality of keywords;
determining a keyword weighting setting associated with the domain in which the plurality of text documents was generated for the online service provider, wherein the keyword weighting setting indicates an elevated importance of one of the plurality of keywords for the domain;
adjusting the weighting of at least one of the plurality of keywords for the ranking based on the keyword weighting setting and a frequency that the one of the plurality of keywords occurs in the plurality of text documents; and
generating an output list of the plurality of keywords based on the ranking and the adjusted weighting.

11. The method of claim 10, wherein the preprocessing the text utilizes at least one of a conversion of tokens from tokenization of the text to vectors, a tag generation for parts of speech in the text, or a named entity recognition of named entities in the text.

12. The method of claim 10, wherein the output list comprises a subset of the plurality of keywords sorted in a descending order based on a set number of highest ranked keywords from the plurality of keywords.

13. The method of claim 10, further comprising:
generating, for a document search engine, search data of the plurality of text documents based on the output list, wherein the search data allows searching for one or more of the plurality of text documents based on the plurality of keywords and the ranking.

14. The method of claim 13, further comprising:
receiving feedback, wherein the feedback identifies at least one of a positive scoring of one of the plurality of keywords or a negative scoring of another one of the plurality of keywords; and
updating the ranking based on the feedback.

15. The method of claim 10, wherein the determining the ranking further uses a document linking operation that generates document links of corresponding ones of the plurality of keywords to one or more of the plurality of text documents where the corresponding ones of the plurality of keywords occurs, and wherein the output list enables searching for one or more of the plurality of text documents based on the document links.

16. The method of claim 10, wherein prior to determining the ranking, the method further comprises:
determining the weighting using a maximal marginal relevance operation of the at least one unsupervised ML model with text embeddings from the text, wherein the determining the weighting further uses a reranking module to re-rank results of the weighting based on the domain.

17. A non-transitory machine-readable medium having stored thereon machine-readable instructions executable to cause a machine to perform operations comprising:
receiving text data associated with electronic transaction processing by at least one user with an online transaction processor, wherein the text data is aggregated from a plurality of transaction processing sources associated with the electronic transaction processing;
determining a domain having computing services associated with the text data, wherein the computing services utilize the plurality of transaction processing sources;
determining a keyword selection module of a plurality of modules based on the domain, wherein the keyword selection module enables identifications of domain-specific keywords found in the text data based on a keyword analysis task associated with the domain and a category for the domain;
determining, using an unsupervised machine learning (ML) framework comprising the keyword selection module and a plurality of unsupervised ML operations configured for keyword extraction and keyword ranking, a plurality of keywords occurring in the text data, wherein the plurality of keywords are determined by extracting the plurality of keywords from the text data using a first one of the plurality of unsupervised ML operations;
scoring the plurality of keywords using a second one of the plurality of unsupervised ML operations, wherein the scoring includes:
weighting the plurality of keywords,
linking the plurality of keywords to corresponding documents of the text data where the plurality of keywords occur,
selecting a set number of highest weighted ones of the plurality of keywords,
determining a keyword weighting setting associated with the domain in which the plurality of transaction processing sources are utilized by a service provider for the electronic transaction processing, wherein the keyword weighting setting indicates an elevated importance of one of the plurality of keywords for the domain, and
reweighting at least one of the plurality of keywords based on the keyword weighting setting and a frequency that the one of the plurality of keywords occurs in the text data; and
outputting a summarization of the text data having the scored plurality of keywords.

18. The non-transitory machine-readable medium of claim 17, wherein prior to the determining the plurality of keywords, the operations further comprise:
performing, on the text data, at least one data preprocessing operation comprising at least one of a token to vector conversion operation, a part of speech tagging operation, or a named entity recognition operation.

19. The non-transitory machine-readable medium of claim 18, wherein the operations further comprise:
implementing, based on the scoring, the plurality of keywords with a search system of at least the text data, wherein the text data comprises a corpus of memoranda, and wherein the search system allows searching of the memoranda from the corpus using selections from the plurality of keywords.

20. The non-transitory machine-readable medium of claim 17, wherein one of the plurality of unsupervised ML operations comprises an embedding-based maximal marginal relevance ranking technique used for the weighting of the plurality of keywords.

* * * * *